June 20, 1933.  J. SYME  1,914,899
WORK CLAMP
Filed Sept. 9, 1931
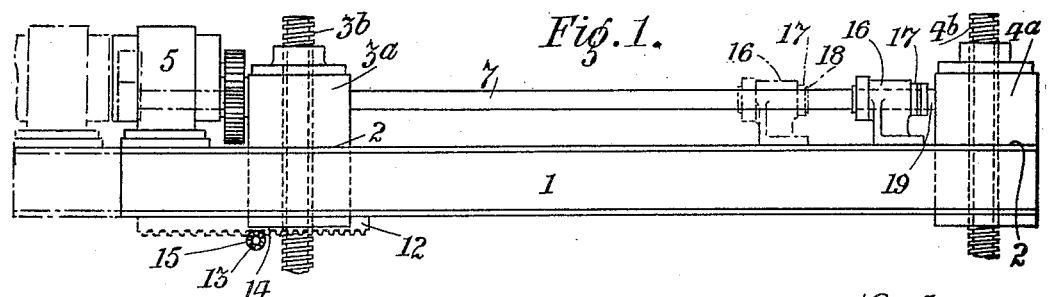
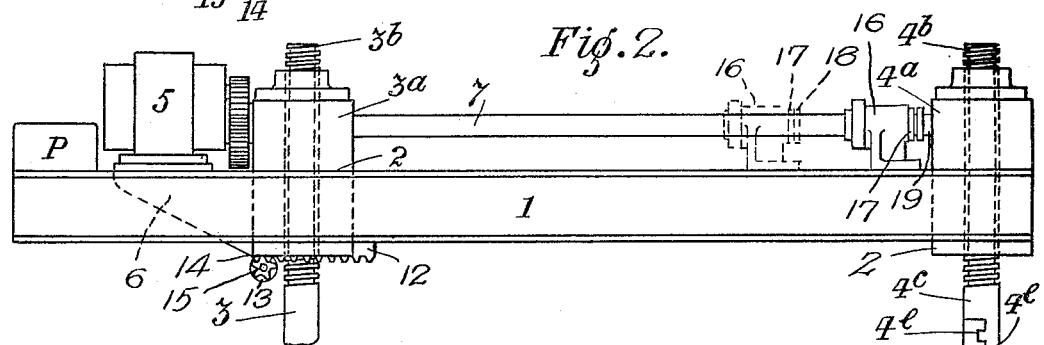
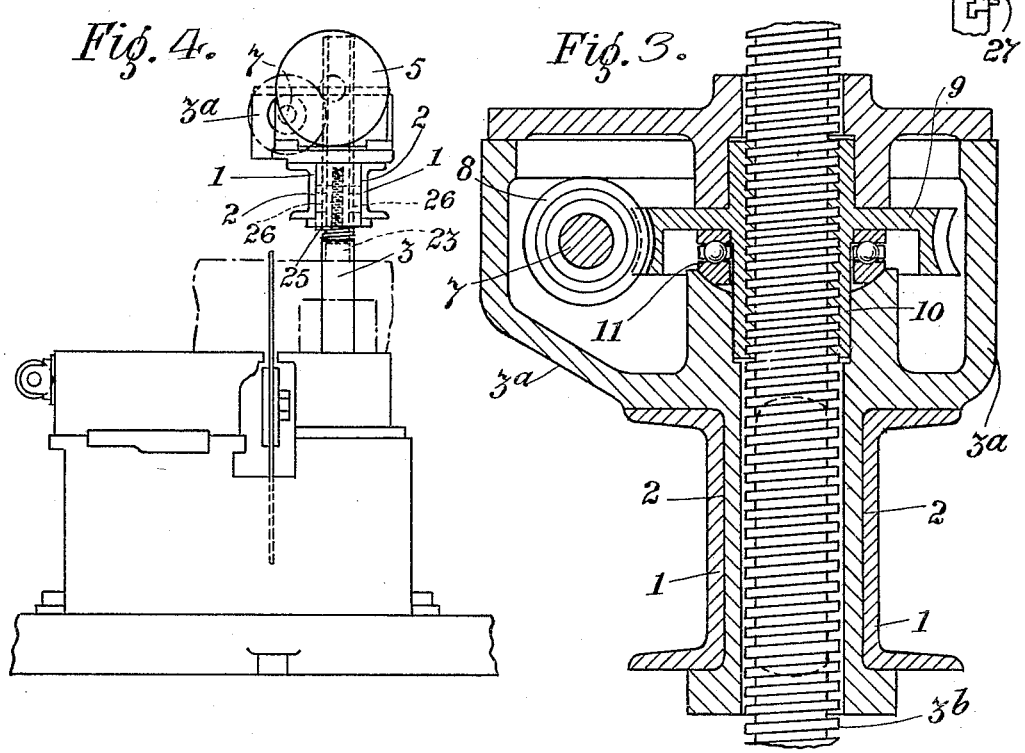
James Syme INVENTOR.
per  ATTORNEY Patented June 20, 1933

1,914,899

UNITED STATES PATENT OFFICE

JAMES SYME, OF JOHNSTONE, SCOTLAND, ASSIGNOR TO CLIFTON & BAIRD LIMITED, OF JOHNSTONE, SCOTLAND

WORK CLAMP

Application filed September 9, 1931, Serial No. 561,887, and in Great Britain September 25, 1930.

This invention relates to cold sawing and other like machines for cutting metals, its object being to provide improved means whereby the work can be quickly disposed on the bed of the machine and firmly held in position. The invention is specially applicable to cold sawing machines.

The invention will now be described by way of example and with reference to the accompanying drawing, wherein:—

Fig. 1 is a side elevation of work clamping means in accordance with the invention;

Fig. 2 is a side elevation of a modification of the clamping means, and

Fig. 3 is an enlarged sectional view on the line 3—3, Fig. 1, of a carrier and the raising and lowering mechanism therein.

The beam is formed by two spaced channelled beams 1 which are secured together and are supported in recesses 2 formed in the carriers $3^a$, $4^a$ on the screw threaded pillars 3, 4. An electric motor 5 drives through suitable gearing, the shaft 7. Worms 8 inside the carriers $3^a$, $4^a$, the construction of which latter will be more clearly seen from Fig. 3, are mounted on the shaft 7. End thrust ball bearings (not shown) are provided at each end of the worms 8. The worms 8 engage worm wheels 9 which are formed integrally with screw threaded bosses 10 adapted to work on the screw threaded parts $3^b$, $4^b$ of the pillars 3, 4. Ball thrust bearings 11 are provided for the worm wheels 9 to take the upward thrust on said wheels when a piece of work is clamped.

Screw clamps 23 are provided to engage the work, these clamps being screwed into block 25 which are recessed to slidably engage and move along strips 26 attached to the inner sides of the channelled beams 1. It will be apparent that the clamps 23 can be laterally adjusted (by sliding movement) to suit the length of the work which is to be clamped and that they can also be vertically adjusted in the blocks 25 to suit the upper surface of the work.

The compound beam 1 is slidably supported in the recesses 2 of the carriers $3^a$ $4^a$ and the electric motor 5 is mounted on a bracket 6 attached to the carrier $3^a$, the bracket 6 being arranged to overhang the beam 1, so that the motor 5 is aligned with respect to the shaft 7. Mechanism is provided to slide the channelled beams 1 laterally so that they are disengaged from the recesses 2 in the carrier $4^a$ and can thereafter be turned on the supporting pillar 3 out of the way of the work which can then be placed in, or removed from, position without hindrance. This mechanism comprises a rack 12 provided on the lower flange of the beam 1 and a pinion 13 engaging said rack and mounted upon a shaft 15 passing through a boss 14 provided on the underside of the carrier $3^a$. The shaft 15 may be manually operated by a handle. In order to balance the beam on the pillar 3, when it has been disengaged from the recesses 2 in the carrier $4^a$, a counter-weight P is mounted on its outer end as shown. The driving shaft 7 passes through a bracket bearing 16 on top of the beam 1. In said bearing a sleeve 17 is provided slidably connected to the shaft 7 by a feather thereon. A positive clutch ring 18 on said sleeve engages a further clutch ring 18 on a counter-shaft 19 mounted in the carrier $4^a$ and operating the raising and lowering mechanism therein.

The method of operating this clamp is as follows:—

When a piece of work is to be placed in position for sawing, the beam is projected to the chain dotted position by the rack and pinion 12, 13, and is then turned about the pillar 3 through an angle of say 90° or so. The work can then readily be placed in position without being hindered by the beam, whereafter, the latter is turned back into position and moved again into engagement with the recesses 2 in the carrier $4^a$. This return movement couples the shaft 7 to countershaft 19 since the bearing bracket 16 moves the clutch ring 18 on the sleeve 17 into engagement with clutch ring 18 on the countershaft 19. The raising and lowering mechanism in both carriers $3^a$ and $4^a$ is then operated to lower the beam to clamp the work.

In Fig. 2, the motor 5 is mounted directly on the end of the beam and serves in place of the counter-weight P described above. The clutch mechanism on the shaft 7 is also modified in that the sleeve 17 is dispensed with and the clutch ring 18 is directly mounted on the flanged end of the shaft 7 which is supported as above in the bearing bracket 16. The worm 8 inside the carrier 3ª will, of course, be slidably fitted on the shaft 7 which latter, in this case, moves together with the beam.

The clamping arrangements described above may be used in conjunction with the usual lateral clamping means on a machine table.

It will be evident that the clamping means described can be further modified in its details of construction without departing from the scope of the invention.

If desired a compressed-air-driven motor may be employed instead of an electric motor for raising and lowering the beam.

The invention, it will be understood, is not limited in its application to sawing machines but can be applied generally to metal working machines such, for example, as a rotary planing or end milling machine.

I claim:—

1. Work clamping means comprising a bed, an overhead clamping beam, a carrier member at each end of said beam and with one of which said beam is detachably associated, two screw threaded pillars mounted on the bed and adapted to support said members, a nut mechanism in each of said members and working on the corresponding pillar, a driving shaft for said mechanisms extending along the beam, an electric motor adapted to drive said shaft and operate the nut mechanisms to raise or lower the clamping beam, mechanism for detaching said beam from one of said carrier members and its supporting pillar so that the beam can be swung round on the other pillar to facilitate removal or positioning of the work, and clutch means on said driving shaft.

2. Work clamping means comprising a bed, an overhead clamping beam, a carrier member at each end of said beam and in which said beam slidably engages, two screw threaded pillars mounted on the bed and adapted to support said members, a nut mechanism in each of said members and working on the corresponding pillar, a driving shaft for said mechanisms extending along the beam, an electric motor adapted to drive said shaft, mechanism for sliding said beam out of engagement with one of said carriers in order that the beam can be swung round on the other pillar to facilitate removal or positioning of the work, and a clutch on said driving shaft.

3. Work clamping means comprising a bed, an overhead clamping beam, a carrier member at each end of said beam and in which said beam slidably engages, two screw threaded pillars mounted on the bed and adapted to support said members, a nut mechanism in each of said members and working on the corresponding pillar, a driving shaft for said mechanisms extending along the beam, an electric motor adapted to drive said shaft, rack and pinion mechanism for sliding said beam out of engagement with one of said carriers in order that the beam can be swung round on the other pillar to facilitate removal or positioning of the work, and a clutch on said driving shaft.

4. Work clamping means comprising a bed, an overhead clamping beam, laterally and vertically adjustable clamping members depending from said beam, a carrier member at each end of said beam and in which said beam slidably engages, two screw threaded supporting pillars on the bed for said carrier members, a nut mechanism in each of said members and working on the corresponding screw threaded pillar, a driving shaft for said mechanisms extending along the beam, an electric motor mounted on one of said carrier members and adapted to drive said shaft, a rack and pinion mechanism for sliding said beam out of engagement with one of said carriers, a clutch on said shaft, and a counterweight on the end of the beam which is not disengaged.

5. Work clamping means comprising a bed, an overhead clamping beam consisting of spaced channel members, carrier members recessed slidably to receive said channel members at or near their ends, two upright screw threaded pillars mounted on the bed, a nut in each of the carrier members adapted to engage the corresponding screw threaded pillar, a worm wheel integral with said nut, an antifriction thrust bearing on said worm wheel, a driving shaft extending along the beam and into said carriers, worms on said shaft engaging said worm wheels, an electric motor mounted on one of said carriers and geared to the driving shaft, a clutch on said shaft intermediate the carriers, a bearing block on the beam for said shaft and carrying a clutch element, a rack on said beam and a fixed pinion for operating said rack and sliding said beam out of engagement with one of said carriers at one end, and a counterweight on the other end of the beam.

6. Work clamping means comprising a bed, an overhead clamping beam, laterally and vertically adjustable clamping members depending from said beam, a carrier member at each end of said beam and in which said beam slidably engages, two screw threaded supporting pillars on the bed for said carrier members, a nut mechanism in each of said members and working on the corresponding screw threaded pillar, a driving shaft for said mechanisms extending along the beam, an electric motor mounted on an end of said beam and adapted to drive said shaft and raise or lower the beam, a rack and pinion mechanism for sliding said beam out of engagement with one of said carriers, and a clutch on the driving shaft.

7. Work clamping means comprising a bed, an overhead clamping beam consisting of spaced channel members, carrier members recessed slidably to receive said channel members at or near their ends, two upright screw threaded pillars mounted on the bed, a nut in each of the carrier members adapted to work on the corresponding screw threaded pillar, a worm wheel integral with said nut, an antifriction thrust bearing on said worm wheel, a driving shaft extending along the beam and into said carriers, worms on said shaft engaging said worm wheels, an electric motor mounted on an end of the clamping beam and geared to said driving shaft, a clutch on said shaft intermediate the carriers, a bearing block on the beam for said shaft, a rack on said beam and a fixed pinion for operating said rack and sliding said beam out of engagement with one of said carriers at one end.

In testimony whereof I affix my signature.

JAMES SYME.